US008654989B2

(12) United States Patent
Pilgrim et al.

(10) Patent No.: US 8,654,989 B2

(45) Date of Patent: Feb. 18, 2014

(54) REAR SURROUND SOUND SYSTEM AND METHOD FOR VEHICLE

(75) Inventors: Michael Pilgrim, Dublin, OH (US); Aaron Ambrose, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 12/873,852

(22) Filed: Sep. 1, 2010

(65) Prior Publication Data

US 2012/0051566 A1 Mar. 1, 2012

(51) Int. Cl.
*H04B 1/00* (2006.01)

(52) U.S. Cl.
USPC .......... 381/86

(58) Field of Classification Search
USPC .......... 381/86, 302, 27, 28, 17–19, 300, 307, 381/104–109
See application file for complete search history.

(56) References Cited

U.S. PATENT DOCUMENTS

| | | | | |
|---|---|---|---|---|
| 6,157,725 | A | 12/2000 | Becker | |
| 6,202,008 | B1 | 3/2001 | Beckert et al. | |
| 6,339,696 | B1 | 1/2002 | Chan et al. | |
| 6,926,116 | B2 | 8/2005 | Shea | |
| 7,085,710 | B1 | 8/2006 | Beckert et al. | |
| 7,190,798 | B2 * | 3/2007 | Yasuhara | 381/86 |
| 7,391,869 | B2 * | 6/2008 | Eid et al. | 381/22 |
| 7,653,203 | B2 * | 1/2010 | Holmi et al. | 381/86 |
| 8,031,880 | B2 * | 10/2011 | Holmi et al. | 381/86 |
| 2005/0271219 | A1 | 12/2005 | Bruelle-Drews | |
| 2010/0080401 | A1 | 4/2010 | Holmi et al. | |

FOREIGN PATENT DOCUMENTS

| | | |
|---|---|---|
| JP | 2006-180546 | 7/2006 |
| JP | 2006-188181 | 7/2006 |
| JP | 2007-281534 | 10/2007 |

* cited by examiner

*Primary Examiner* — Lun-See Lao

(74) *Attorney, Agent, or Firm* — Fay Sharpe LLP

(57) ABSTRACT

A vehicle rear surround sound audio system for a vehicle includes a plurality of speaker nodes, each of the speaker nodes including at least one speaker. A subset of the speaker nodes are located in a video viewing region of a vehicle. A head unit includes a DVD or other multi-channel surround sound source, a digital signal processor (DSP), an amplifier, and a fader. The head unit selectively implements: (i) a normal audio mode in which a plurality of different surround sound speaker signals are output to the plurality of speaker nodes according to a first mapping; or (ii) a rear surround audio mode in which all of the plurality of different surround sound speaker signals are output to only the subset of speaker nodes located in the video viewing region according to a second mapping such that the subset of speaker nodes are active to output all of the surround sound speaker signals.

11 Claims, 6 Drawing Sheets

REAR SURROUND SOUND SYSTEM AND METHOD FOR VEHICLE

BACKGROUND

Known surround sound audio systems for vehicles utilize a single mapping of the surround sound audio signals to the vehicle speakers, regardless of the fader position. The fader and amplifier are used to vary only the power/gain of the surround sound signals to bias the sound toward the front or rear of the vehicle as controlled by a user of the system. The mapping of each surround sound signal to a particular speaker is constant for all positions of the fader.

FIG. 1 illustrates a vehicle V and a typical ten speaker audio/video surround sound system S for same. The audio/video system includes a head unit HU as is known in the art, that typically includes and/or is connected to various audio/video output devices such as an AM/FM tuner, a CD player, mp3 player, a DVD video player, and one or more video display monitors M for displaying video images to occupants of the vehicle. As shown in FIG. 2, the system S includes a DVD video player or other multi-channel source 10 connected to a surround sound decoder 12, that is at least 5.1 channels, and a digital signal processor (DSP) 14, both of which are located in or otherwise connected to the head unit HU. The head unit HU also includes or is connected to an audio amplifier 16 that drives each of the following eight speaker nodes A-H that are located where shown in FIG. 1 and/or as indicated by their name:

Speaker Node A=Front Left Tweeter/Front Left Door (FL-TW/FL-Door)

Speaker Node B=Front Right Tweeter/Front Right Door (FR-TW/FR-Door)

Speaker Node C=Center (CTR) (typically located in the front of the vehicle)

Speaker Node D=Rear Left Door (RL-Door)

Speaker Node E=Rear Right Door (RR-Door)

Speaker Node F=Left Surround (L-Surr)

Speaker Node G=Right Surround (R-Surr)

Speaker Node H=Subwoofer (Subw) (typically located in the rear of the vehicle)

Each speaker node A-H comprises at least one speaker for output of sound. The head unit HU further includes or is connected to a fader 18 that varies the audio signal power or gain for each of the audio signals output from the amplifier 16 to the various speaker nodes A-H.

A video viewing region VR is defined in the vehicle V and comprises all seating locations except the driver and front-seat passenger. Passengers seated in the video viewing region VR are able to face forward and view the one or more video display monitors M that are active to display video images of movies and the like. A subset D-H of said speaker nodes A-H is located in said video viewing region VR.

More particularly, FIG. 2 shows that the DVD player or other multi-channel audio source 10 outputs its surround sound audio signal to the decoder 12 that derives and outputs the 5.1 channel surround sound audio channel signals from the received surround sound audio signal as follows: (i) Front Left; (ii) Front Right; (iii) Center; (iv) Rear Left; (v) Rear Right; (vi) Subwoofer. These surround sound audio signals are output from the decoder 12 to the DSP 14 which filters, conditions, adjusts, and otherwise derives at least ten surround sound speaker signals that are output to the eight respective speaker nodes A-H through to an amplifier 16 that amplifies each of the 10 surround sound speaker signals according to the setting of the fader 18. It can be seen in FIG. 2 that the head unit HU is configured and programmed such that the DSP 14 maps the surround sound speaker signals to the speaker nodes as follows:

| | |
|---|---|
| Front Left | Speaker Node A |
| Front Right | Speaker Node B |
| Center | Speaker Node C |
| Rear Left | Speaker Node D |
| Rear Right | Speaker Node E |
| Rear Left | Speaker Node F |
| Rear Right | Speaker Node G |
| Subwoofer | Speaker Node H |

FIG. 2 also shows three different fader levels as controlled by the fader 18: Fader Center, Fader Rear +x, Fader Rear Max. For the "Fader +x" and "Fader Rear Max" positions, the sound output within the vehicle V is biased toward the video viewing region VR in the rear of the vehicle (Fader Front +x and Fader Front Max are also available but not pertinent to the present discussion). At the "Fader Center" position, the amplifier 16 outputs full or max audio signal power level to all speak nodes A-H as shown. At the "Fader Rear +x" position, the amplifier 16 outputs an attenuated "−x" audio signal power level to the speaker nodes A-C, and outputs the full max audio signal power level to speaker nodes D-H. At the "Fader Rear Max" position, the amplifier 16 outputs the "minus infinity" or "−∞" audio signal power level to speaker nodes A-C (indicating no sound), and outputs the full max audio signal power level to speaker nodes D-H that define the subset of speaker nodes located in the video viewing region VR.

It is apparent in FIG. 2 that the system S is configured and programmed such that changes in the fader state between the "Fader Center" "Fader Rear +x" and "Fader Rear Max" levels changes only the gain in the audio signal power level output to some of the speaker nodes A-H to control the sound volume output from the various speaker nodes A-H, while the mapping of the surround sound speaker signals from the DSP 14 to the speaker nodes A-H is unchanged. As such, when occupants of the vehicle V located in the video viewing region VR are viewing a DVD or other video on the monitor(s) M and the fader 18 is adjusted to "Fader Rear +x" or "Fader Rear Max," as is often the case when the front-seat passengers cannot see the video display monitor(s) M and do not want to be distracted by the associated sound, the Front Left, Front Right and Center surround sound audio signals output from the DSP 14 and amplifier 16 are reduced or eliminated, which can degrade the surround sound experience for the passengers in the video viewing region VR of the vehicle V that are viewing the video images on the monitor(s).

A drawback of such prior systems is that when the fader is controlled to bias the sound toward the rear of the vehicle for viewing of a DVD or other video including surround sound audio, some of the surround sound audio signals are attenuated or even completely omitted from playback through the vehicle speaker system. Such an approach does not provide a true surround sound audio experience to those vehicle passengers viewing the video.

SUMMARY

In accordance with one aspect of the present development, a vehicle rear surround sound audio system includes a vehicle comprising a plurality of speaker nodes, each of the speaker nodes comprising at least one speaker. A subset of the speaker nodes are located in a video viewing region of a vehicle. A head unit selectively implements: (i) a normal audio mode in which a plurality of different surround sound speaker signals are output to said plurality of speaker nodes according to a first mapping; (ii) a rear surround audio mode in which all of said plurality of different surround sound speaker signals are output to only said subset of speaker nodes located in the video viewing region according to a second mapping such that said subset of speaker nodes are active to output all of said surround sound speaker signals.

In accordance with another aspect of the present development, a method for vehicle rear surround sound audio includes selectively implementing a normal audio mode in which a plurality of different surround sound speaker signals are output to a plurality of speaker nodes according to a first mapping; and selectively implementing a rear surround audio mode in which all of the plurality of different surround sound speaker signals are output to only a subset of the speaker nodes according to a second mapping such that the subset of speaker nodes is active to output all of the surround sound speaker signals in the rear surround audio mode.

DETAILED DESCRIPTION

Figure 3:
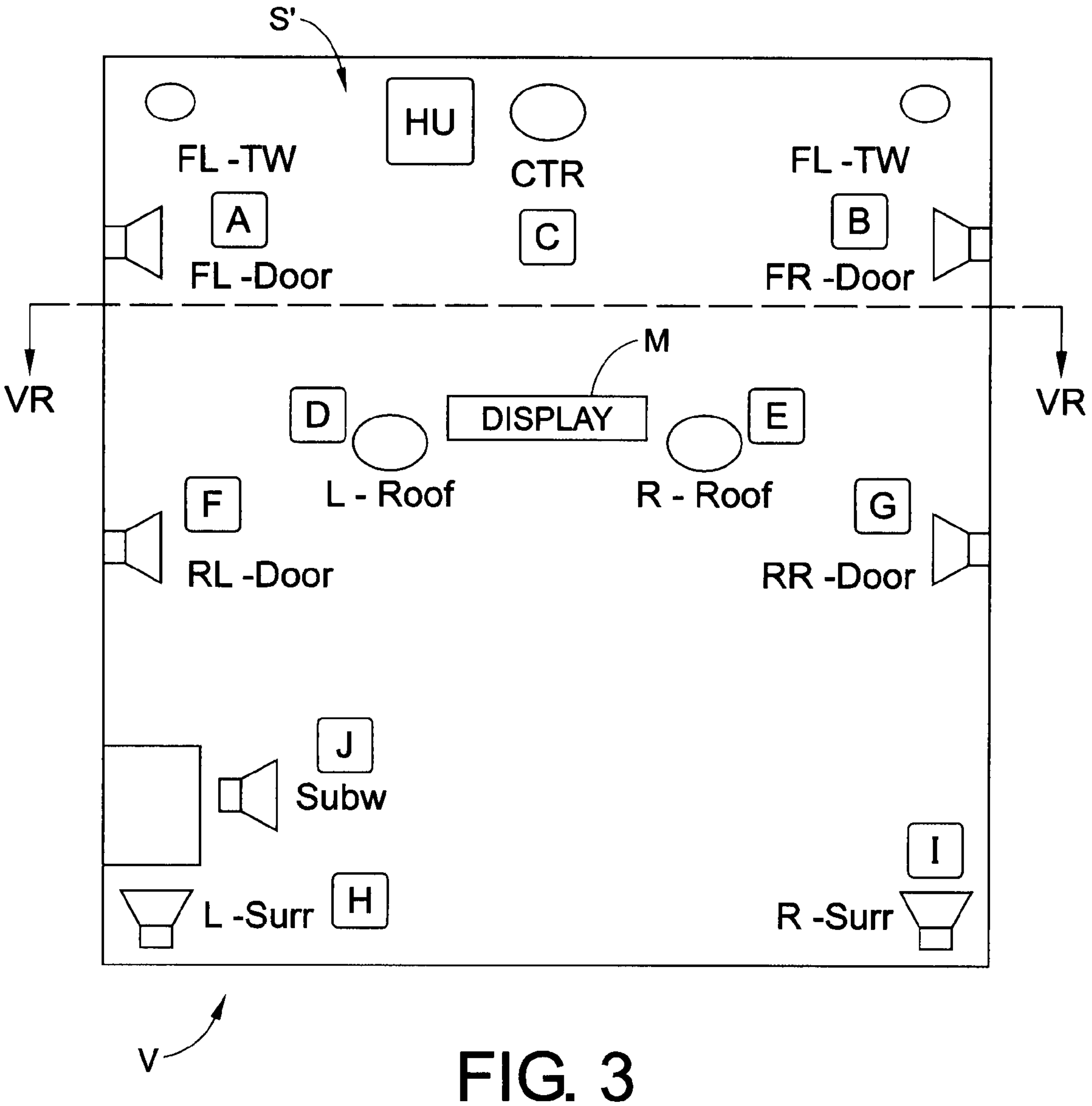
FIG. 3 illustrates a vehicle including a twelve speaker audio/video surround sound system in accordance with an exemplary embodiment.

FIG. 3 illustrates a vehicle V and an exemplary embodiment of twelve speaker audio/video surround sound system S' for same. The system S' comprises ten speaker nodes A-J that are located where shown in FIG. 3 and/or as indicated by their name:

Speaker Node A=Front Left Tweeter/Front Left Door (FL-TW/FL-Door)

Speaker Node B=Front Right Tweeter/Front Right Door (FR-TW/FR-Door)

Speaker Node C=Center (CTR) (typically located in the front of the vehicle)

Speaker Node D=Left Roof (L-Roof)

Speaker Node E=Right Roof (R-Roof)

Speaker Node F=Rear Left Door (RL-Door)

Speaker Node G=Rear Right Door (RR-Door)

Speaker Node H=Left Surround (L-Surr)

Speaker Node I=Right Surround (R-Surr)

Speaker Node J=Subwoofer (Subw) (typically located in the rear of the vehicle)

Each speaker node A-J comprises at least one speaker for output of sound. The video viewing region VR is defined in the vehicle V and comprises all seating locations except the driver and front-seat passenger. Passengers seated in the video viewing region VR are able to face forward and view the one or more video display monitors M that are active to display video images of movies and the like. A subset D-J of the speaker nodes A-J is located in the video viewing region VR.

Figure 4:
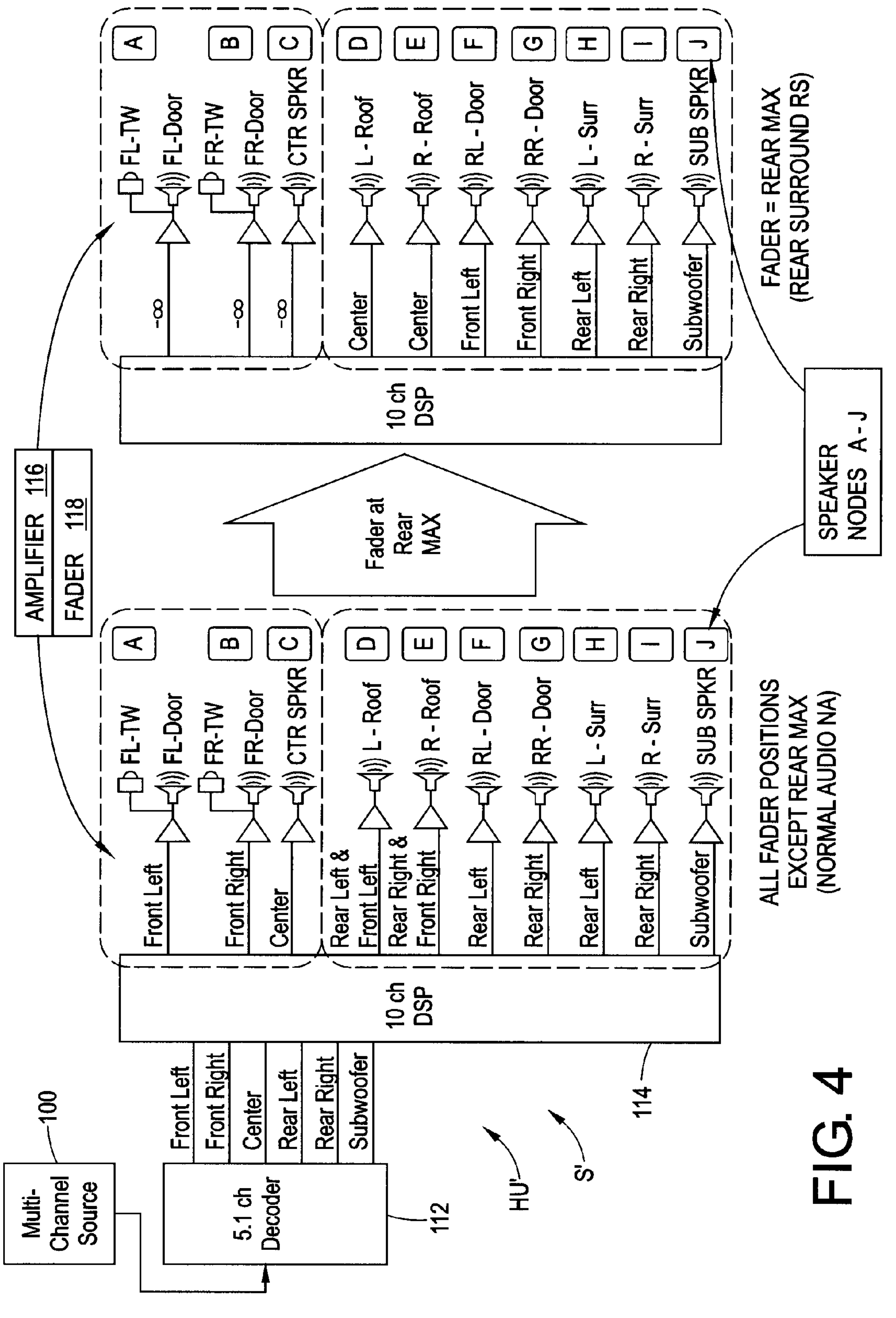
FIG. 4 illustrates the system of FIG. 3 and a method for controlling same to provide a rear surround mode in accordance with an exemplary embodiment.

FIG. 4 illustrates the rear surround sound system S' of FIG. 3 and also shows an exemplary method for controlling same that overcomes the above-noted deficiencies and others. FIG. 4 shows that a head unit HU' includes DVD player or other multi-channel audio source 100 that outputs its surround sound audio signal to a decoder 112 that derives and outputs at least the 5.1 channel surround sound audio channel signals from the received surround sound audio signal as follows: (i) Front Left; (ii) Front Right; (iii) Center; (iv) Rear Left; (v) Rear Right; (vi) Subwoofer. These surround sound audio signals are output from the decoder 112 to the DSP 114 which filters, conditions, adjusts, and otherwise derives at least ten surround sound speaker signals that are output to the ten respective speaker nodes A-J through to an amplifier 116 that amplifies each of the 10 surround sound speaker signals. Each speaker node A-J comprises at least one speaker for output of sound. The head unit HU' includes or is connected to a fader 118 that varies the audio signal power output or gain for each of the audio signals output from the amplifier 116 to the various speaker nodes A-J. In the case where the DVD player comprises a Blu-Ray player, the decoder 112 decodes and outputs 7.1 surround sound audio channels, and it is not intended that the present development be limited to 5.1 channel, 7.1 channel or any other specific number of surround sound audio channels.

As shown in FIG. 4, the head unit HU' is configured and programmed to implement two different audio modes: (i) a normal audio mode NA for all fader positions except "Fader Rear Max;" and, (ii) a rear surround mode RS for the "Fader Rear Max" position. In the normal audio mode NA, the DSP 114, amplifier 116 and fader 118 map the audio speaker signals to the speaker nodes A-J according to a first mapping as follows, with max gain for all signals:

| | |
|---|---|
| Front Left | Speaker Node A |
| Front Right | Speaker Node B |
| Center | Speaker Node C |
| Rear Left & Front Left | Speaker Node D |
| Rear Right & Front Right | Speaker Node E |
| Rear Left | Speaker Node F |
| Rear Right | Speaker Node G |
| Rear Left | Speaker Node H |
| Rear Right | Speaker Node I |
| Subwoofer | Speaker Node J |

Furthermore, in the normal audio mode NA, the amplifier 116 functions as described above in relation to FIG. 2 to reduce the power output to the speaker nodes A-C when the fader 118 is set to the "Fader Rear +x" position, without altering the above mapping of surround sound speaker signals to the speaker nodes A-J.

Figure 2:
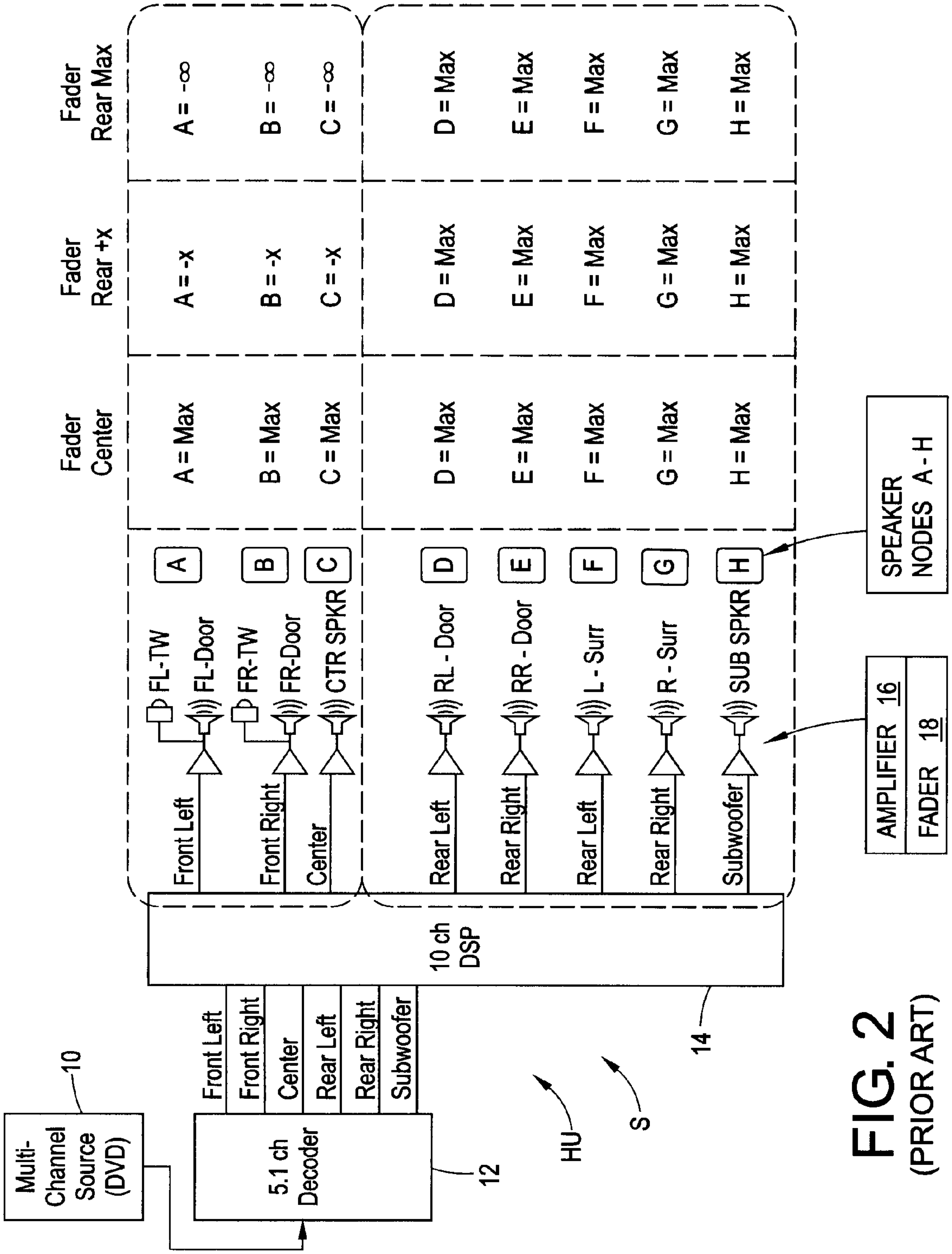
FIG. 2 (PRIOR ART)
FIG. 2 illustrates a conventional vehicle rear surround sound system and method.

Unlike the conventional system shown in FIG. 2, the head unit HU' includes the above-noted rear surround mode RS which is normally activated whenever the fader 118 is set to "Fader Rear Max" or that is automatically activated whenever the DVD player 100 is in use and outputting surround sound audio data. When the rear surround mode RS is active, as shown in FIG. 3, the head unit HU' and its DSP 114 and amplifier 116 are configured to re-map all of the surround sound speaker signals from the DSP 114 to the to the speaker nodes A-J according to a second mapping as follows:

| | |
|---|---|
| −∞ | Speaker Node A |
| −∞ | Speaker Node B |
| −∞ | Speaker Node C |
| Center | Speaker Node D (L-Roof) |
| Center | Speaker Node E (R-Roof) |
| Front Left | Speaker Node F (RL-Door) |
| Front Right | Speaker Node G (RR-Door) |
| Rear Left | Speaker Node H (L-Surr) |
| Rear Right | Speaker Node I (R-Surr) |
| Subwoofer | Speaker Node J (Subw) |

Figure 1:
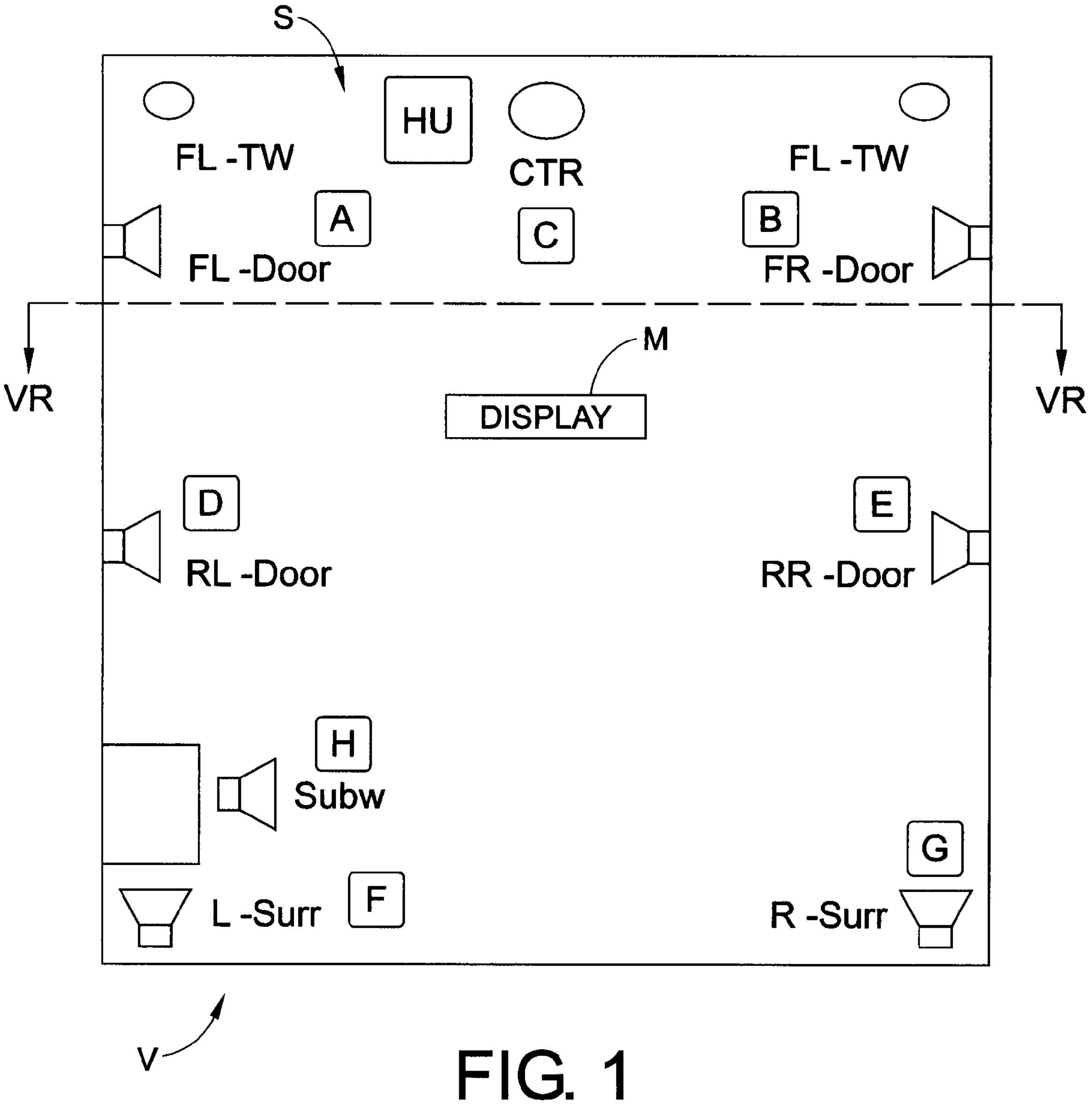
FIG. 1 (PRIOR ART)
FIG. 1 illustrates a vehicle and a typical ten speaker audio/video surround sound system for same.

Furthermore, the fader 118 will control the amplifier 16 to output max gain signals to all of the active surround sound speaker nodes D-J that define the subset of speaker nodes in the video viewing region VR, and to output the −infinity (−∞) gain level to the other speaker nodes A-C. With reference also to FIG. 1, those of ordinary skill in the art will recognize that for vehicle passengers viewing the video display monitor M in the video viewing region VR of the vehicle, the above described rear surround mode RS will provide an authentic surround sound experience as compared to the conventional system described in relation to FIG. 2. Speaker node D and speaker node E are located in a forward part of the video viewing region VR adjacent opposite left and right sides of a centrally located video display monitor M. Speaker node H and speaker node I are located in a rear part of said video viewing region VR respectively adjacent opposite left and right sides of the video viewing region VR. Speaker node F and speaker node G are located in a middle part of the video viewing region VR, between the forward part and the rear part of the video viewing region VR, respectively adjacent the opposite left and right sides of the video viewing region VR. Also, speaker nodes D and E are located closer to the lateral centerline of the video viewing region VR defined centrally between the opposite lateral left and right sides of the video viewing region VR. As such, the center surround sound channel will be appropriately directed to speaker nodes D and E located near the front and center of the portion of the video viewing region VR adjacent the video display monitor M, the front left and front right surround sound channels will be located toward the front and respectively on the left and right sides of the video viewing region VR, and the Rear Left and Rear Right surround sound channels will be located toward the rear and respectively on the left and right sides of the video viewing region VR.

Figure 5:
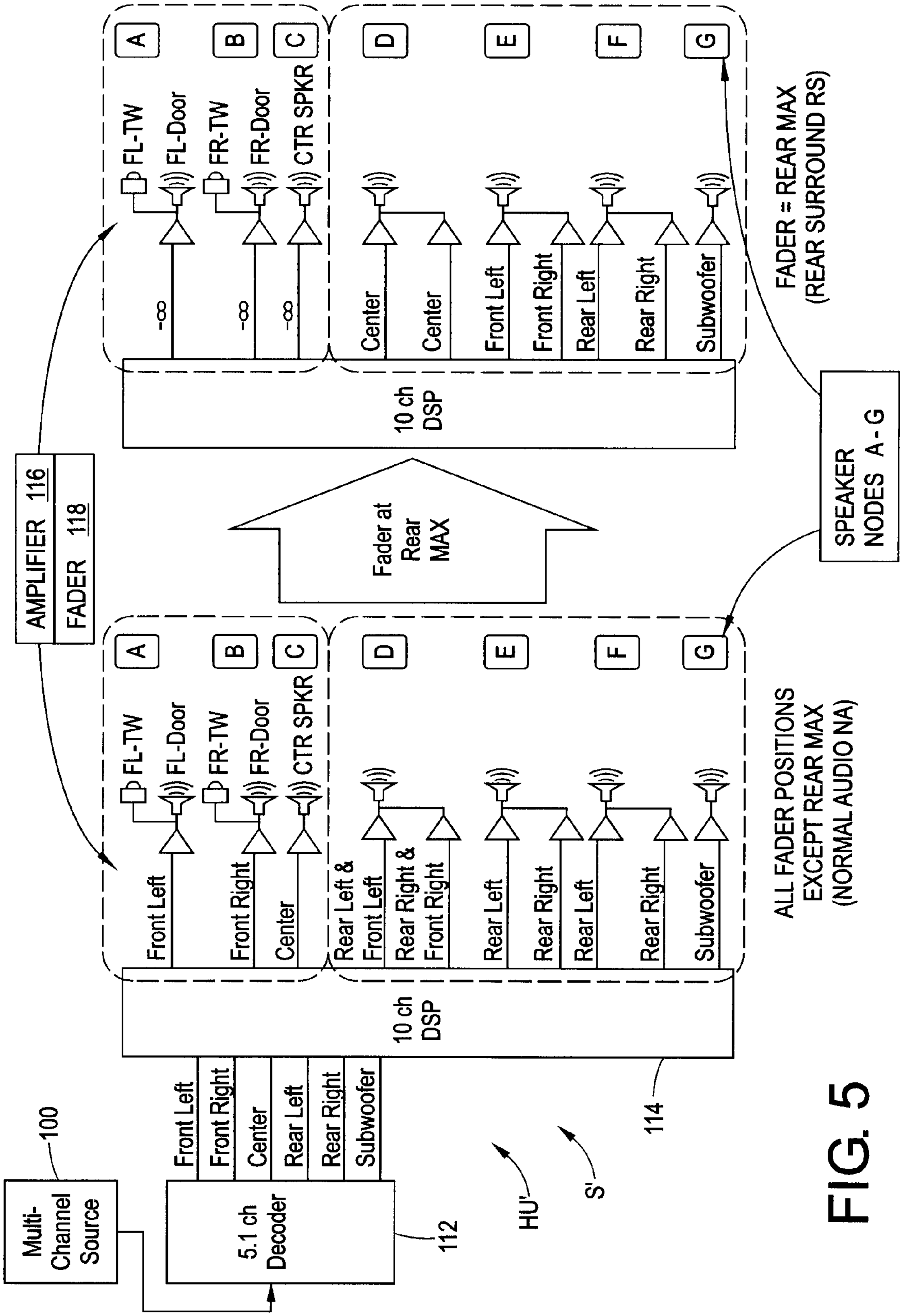
FIG. 5 shows a system and method for providing rear surround mode in accordance with an alternative exemplary embodiment.

In an alternative embodiment as shown in FIG. 5, the system S' includes a video viewing region VR comprising a minimum of three speaker nodes and a maximum of four speaker nodes, each of which nodes includes one or more speakers as follows: (i) a first speaker node D; (ii) a second speaker node E; (iii) a third speaker node F; and, optionally, a fourth speaker node G. In this alternative embodiment, the system functions as described above in relation to FIG. 4, except that in the normal audio mode, the DSP 114, amplifier 116 and fader 118 map the audio speaker signals to the speaker nodes A-G according to a first mapping as follows, with max gain for all signals:

| | |
|---|---|
| Front Left | Speaker Node A |
| Front Right | Speaker Node B |
| Center | Speaker Node C |
| Rear Left & Front Left | Speaker Node D |
| Rear Right & Front Right | Speaker Node D |
| Rear Left | Speaker Node E |
| Rear Right | Speaker Node E |
| Rear Left | Speaker Node F |
| Rear Right | Speaker Node F |
| Subwoofer | Speaker Node G (if included). |

When the rear surround mode RS is active for the embodiment of FIG. 5, the head unit HU' and its DSP 114 and amplifier 116 are configured to re-map all of the surround sound speaker signals from the DSP 114 to the to the speaker nodes A-G according to a second mapping as follows:

| | |
|---|---|
| −∞ | Speaker Node A |
| −∞ | Speaker Node B |
| −∞ | Speaker Node C |
| Center | Speaker Node D |
| Front Left | Speaker Node E |
| Front Right | Speaker Node E |
| Rear Left | Speaker Node F |
| Rear Right | Speaker Node F |
| Subwoofer | Speaker Node G (if included). |

Figure 6:
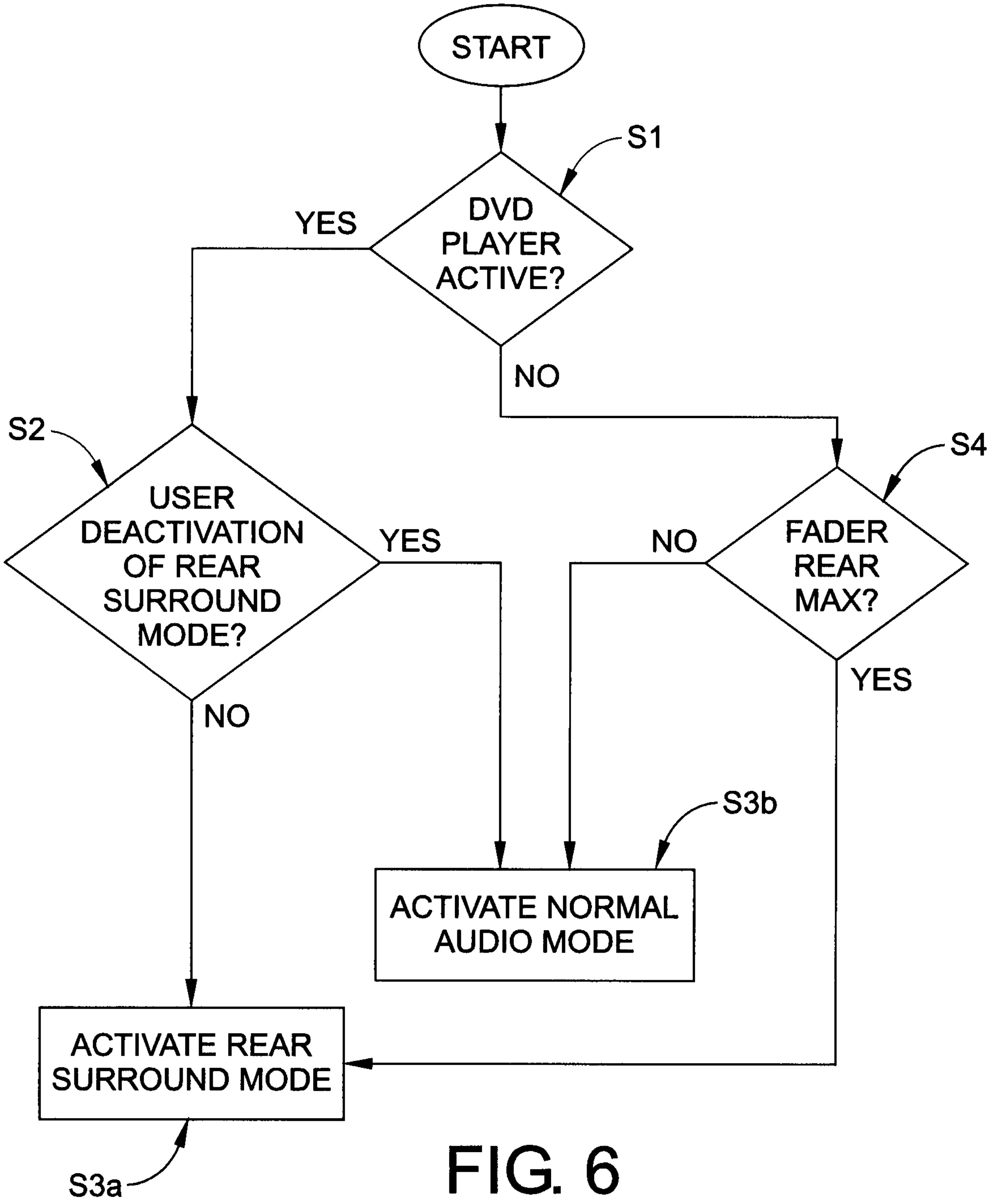
FIG. 6 is a flow chart that illustrates activation of the rear surround sound mode.

FIG. 6 is a flow chart that illustrates activation of the rear surround sound mode RS in accordance with one example of the present development. In a step S1, the head unit HU' determines if the DVD player (or other multi-channel surround sound source 100) is active. If the DVD player is active, the head unit HU' implements a step S2 to determine if the rear surround mode has been manually deactivated and, if not, the head unit HU' activates the rear surround mode in a step S3a. If the head unit HU' determines in step S1 that DVD player is active but determines in step S2 that the rear surround mode has been deactivated, a step S3b is implemented to activate the normal audio mode NA. If the head unit HU' determines in step S1 that DVD player is not active, the head unit then implements a step S4 to determine if a user has manually set the fader 118 to the "Fader Rear Max" position and, if so, the head unit HU' implements the step S3a to activate the rear surround mode RS. Otherwise, if the head unit HU' determines in step S4 that the "Fader Rear Max" position has not been selected, then the head unit HU' implements the step S3b to activate the normal audio mode NA.

The head unit HU' includes hardware switches and/or graphical user interface (GUI) (software) switches by which a user can manually activate or deactivate the rear surround mode RS and/or by which the user can manually change the level of the fader 118 to the "Fader Rear Max" or other.

The disclosure has been described with reference to the exemplary embodiments. Modifications and alterations will occur to others upon reading and understanding the preceding detailed description, and it is intended that the disclosure be construed as including all such modifications and alterations in so far as they come within the scope of the appended claims or the equivalents thereof.

The invention claimed is:

1. A vehicle rear surround sound audio system comprising:

a vehicle comprising a plurality of speaker nodes, each of said speaker nodes comprising at least one speaker, wherein a subset of said speaker nodes are located in a video viewing region of a vehicle, said plurality of speaker nodes comprising Speaker Nodes A, B, C, D, E, F, G, H, I, J, wherein:

Node A comprises a Front Left Tweeter speaker (FL-TW) and a Front Left Door speaker (FL-Door);

Node B comprises a Front Right Tweeter speaker (FR-TW) and a Front Right Door speaker (FR-Door);

Node C comprises a Center speaker (CTR);

Node D comprises a Left Roof speaker (L-Roof);

Node E comprises a Right Roof speaker (R-Roof);

Node F comprises a Rear Left Door speaker (RL-Door);

Node G comprises a Rear Right Door speaker (RR-Door);

Node H comprises a Left Surround speaker (L-Surr);

Node I comprises a Right Surround speaker (R-Surr);

Node J comprises a Subwoofer speaker (Subw);

a head unit that selectively implements:

a normal audio mode in which a plurality of different surround sound speaker signals are output to all of said plurality of speaker nodes in said vehicle according to a first mapping for output of sound by all of said plurality of speaker nodes said plurality of surround sound speaker signals comprising: Front Left, Front Right, Center, Rear Left, Rear Right, and Subwoofer;

a rear surround audio mode in which all of said plurality of different surround sound speaker signals are output to only said subset of speaker nodes located in said video viewing region according to a second mapping such that said subset of speaker nodes located in said video viewing region are active to output all of said plurality of surround sound speaker signals and such that each of said speaker nodes not in said subset are set to a minus infinity (−∞) gain level whereby said speaker nodes not in said subset are not operative for sound output during said second mapping, wherein said Speaker Node A, said Speaker Node B, and said Speaker Node C are not contained in said subset of speaker nodes located in said video viewing region of said vehicle;

said first mapping during said normal audio mode comprising:

| | |
|---|---|
| Front Left | mapped to Speaker Node A; |
| Front Right | mapped to Speaker Node B; |
| Center | mapped to Speaker Node C; |
| Rear Left + Front Left | mapped to Speaker Node D; |
| Rear Right + Front Right | mapped to Speaker Node E; |
| Rear Left | mapped to Speaker Node F; |
| Rear Right | mapped to Speaker Node G; |
| Rear Left | mapped to Speaker Node H; |
| Rear Right | mapped to Speaker Node I; |
| Subwoofer | mapped to Speaker Node J; |

said second mapping during said rear surround mode comprising:

| | |
|---|---|
| Center | mapped to Speaker Node D; |
| Center | mapped to Speaker Node E; |
| Front Left | mapped to Speaker Node F; |
| Front Right | mapped to Speaker Node G; |
| Rear Left | mapped to Speaker Node H; |
| Rear Right | mapped to Speaker Node I; |
| Subwoofer | mapped to Speaker Node J; |

such that in said second mapping implemented for said rear surround mode, all of said plurality of surround sound speaker signals are mapped to said speaker nodes D, E, F, G, H, I, J that form said subset of speaker nodes located in said video viewing region without loss of any of said surround sound speaker signals.

2. The vehicle rear surround sound audio system as set forth in claim 1, wherein:

said Speaker Node D and said Speaker Node E are located in a forward part of said video viewing region adjacent opposite left and right sides of a video display monitor;

said Speaker Node H and said Speaker Node I are located in a rear part of said video viewing region respectively adjacent opposite left and right sides of said video viewing region; and, said Speaker Node F and said Speaker Node G are located in a middle part of said video viewing region, between said forward part and said rear part of said video viewing region, respectively adjacent said opposite left and right sides of said video viewing region.

3. The vehicle rear surround sound audio system as set forth in claim 2, wherein said head unit outputs said surround sound speaker signals to each speaker node in said subset with a maximum (max) gain level when said rear surround audio mode is active.

4. The vehicle rear surround sound audio system as set forth in claim 3, wherein said head unit activates said rear surround audio mode whenever a multi-channel surround sound source connected to said head unit is active.

5. The vehicle rear surround sound audio system as set forth in claim 3, wherein said head unit activates said rear surround audio mode whenever a fader connected to said head unit is set to a “Fader Rear Max” level.

6. The vehicle rear surround sound audio system as set forth in claim 1, wherein said head unit comprises a hardware or a software switch for selective user deactivation of said rear surround sound audio mode.

7. A method for vehicle rear surround sound audio, said method comprising:

selectively implementing a normal audio mode in which a plurality of different surround sound speaker signals are output to a first plurality of speaker nodes in a vehicle according to a first mapping, said plurality of surround sound speaker signals comprising Front Left, Front Right, Center, Rear Left, Rear Right, and Subwoofer signals, and said plurality of speaker nodes comprising Speaker Nodes A, B, C, D, E, F, G, H, I, J, wherein:

Node A comprises a Front Left Tweeter speaker (FL-TW) and a Front Left Door speaker (FL-Door);

Node B comprises a Front Right Tweeter speaker (FR-TW) and a Front Right Door speaker (FR-Door);

Node C comprises a Center speaker (CTR);

Node D comprises a Left Roof speaker (L-Roof);

Node E comprises a Right Roof speaker (R-Roof);

Node F comprises a Rear Left Door speaker (RL-Door);

Node G comprises a Rear Right Door speaker (RR-Door);

Node H comprises a Left Surround speaker (L-Surr);

Node I comprises a Right Surround speaker (R-Surr);

Node J comprises a Subwoofer speaker (Subw);

selectively implementing a rear surround audio mode in which all of said plurality of different surround sound speaker signals output to said first plurality of speaker nodes according to said first mapping are output to only a subset of said speaker nodes located in a video viewing region of said vehicle according to a second mapping such that said subset of speaker nodes located in said video viewing region are active to output all of said surround sound speaker signals and speaker nodes not in said subset are set to a minus infinity (−∞) gain level whereby said speaker nodes not in said subset are not operative for sound output during said second mapping, wherein speaker nodes A, B, and C are not in said subset;

said first mapping during said normal audio mode comprising:

| | |
|---|---|
| Front Left | mapped to Speaker Node A; |
| Front Right | mapped to Speaker Node B; |
| Center | mapped to Speaker Node C; |
| Rear Left + Front Left | mapped to Speaker Node D; |
| Rear Right + Front Right | mapped to Speaker Node E; |
| Rear Left | mapped to Speaker Node F; |
| Rear Right | mapped to Speaker Node G; |
| Rear Left | mapped to Speaker Node H; |
| Rear Right | mapped to Speaker Node I; |
| Subwoofer | mapped to Speaker Node J; |

said second mapping during said rear surround mode comprising:

| | |
|---|---|
| Center | mapped to Speaker Node D; |
| Center | mapped to Speaker Node E; |
| Front Left | mapped to Speaker Node F; |
| Front Right | mapped to Speaker Node G; |
| Rear Left | mapped to Speaker Node H; |
| Rear Right | mapped to Speaker Node I; |
| Subwoofer | mapped to Speaker Node J; |

such that in said second mapping implemented for said rear surround mode, all of said plurality of surround sound speaker signals are mapped to said speaker nodes D, E, F, G, H, I, J that form said subset of speaker nodes located in said video viewing region without loss of any of said surround sound speaker signals.

8. The method as set forth in claim 7, wherein:

said Speaker Node D and said Speaker Node E are located in a forward part of said video viewing region adjacent opposite left and right sides of a video display monitor;

said Speaker Node H and said Speaker Node I are located in a rear part of said video viewing region respectively adjacent opposite left and right sides of said video viewing region; and, said Speaker Node F and said Speaker Node G are located in a middle part of said video viewing region, between said forward part and said rear part of said video viewing region, respectively adjacent said opposite left and right sides of said video viewing region.

9. The method as set forth in claim 8, wherein said surround sound speaker signals are output to each speaker node in said subset with a maximum (max) gain level when said rear surround audio mode is active.

10. The method as set forth in claim 9, wherein said rear surround audio mode is activated whenever a multi-channel surround sound source is active.

11. The method as set forth in claim 8, further comprising activating said rear surround audio mode automatically whenever a fader is set to "Fader Rear Max" to deactivate all of said speaker nodes not in said subset.

* * * * *